Feb. 27, 1923. 1,446,964
T. CUNNINGHAM
SOLDERING TOOL
Filed Jan. 22, 1921
FIG. I.
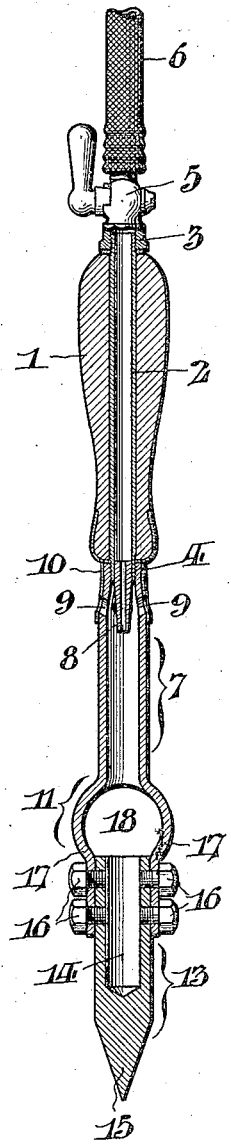
FIG. II.
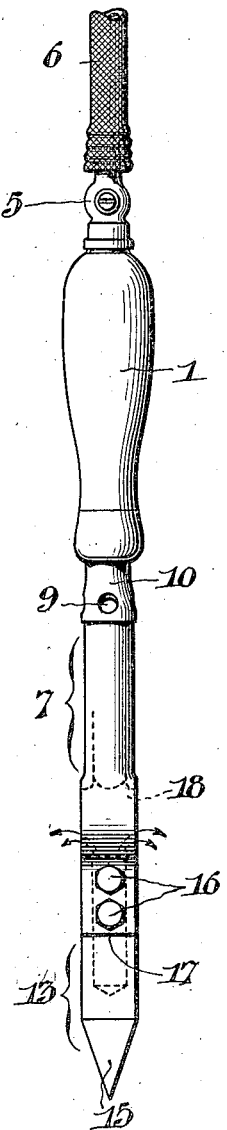
INVENTOR.
Thomas Cunningham, Patented Feb. 27, 1923.

1,446,964

UNITED STATES PATENT OFFICE.

THOMAS CUNNINGHAM, OF PHILADELPHIA, PENNSYLVANIA, ASSIGNOR TO EULALEA J. LOVE, OF PHILADELPHIA, PENNSYLVANIA.

SOLDERING TOOL.

Application filed January 22, 1921. Serial No. 439,080.

*To all whom it may concern:*

Be it known that I, THOMAS CUNNINGHAM, a citizen of the United States, residing in Philadelphia, in the county of Philadelphia and State of Pennsylvania, have invented certain new and useful Improvements in Soldering Tools, whereof the following is a specification, reference being had to the accompanying drawings.

The invention relates to tools such as are used in soldering, brazing and analogous operations, and more especially to soldering irons in which fuel gas is employed as a heating medium.

The object of my invention is to secure maximum efficiency in soldering tools of the stated type, together with utmost simplicity so that they may be easily manipulated, cheaply manufactured, and prove durable in long continued service.

Other objects and advantages of my invention will become apparent from the detailed description which follows:

In the drawings, Fig. I is an axial sectional view of a soldering tool conveniently embodying my invention; and Fig. II is an elevation of the same.

The structure as herein represented, has a handle 1 of suitable non-conductive material, preferably wood, through which extends axially, a metallic tube 2. This tube is somewhat longer than the handle so as to permit protrusion of its opposite ends which are screw threaded as clearly shown at 3 and 4 in Fig. I. To the protruding end 3 of the tube 2, is secured a cock 5 of well known construction adapted for controlling the flow of fuel gas supplied through a flexible tube 6 attached to the nipple of said cock.

To the opposite protrusion 4 of the tube 2, is secured, in axial continuation, the reduced end of a hollow shank 7, which, as will be seen from the illustration, is considerably larger in diameter than said tube. An outlet nozzle 8 of the tube 2, extends a short distance within the hollow of the shank 7, and at this region, the latter is provided with a series of inlet openings 9—9 which are controllable by means of an adjustable apertured band 10 held from displacement by virtue of its conformity in configuration with that of the shank end on the one hand, and, on the other, by being overhung by the lower end of the handle 1. From this construction, it will be apparent that the quantity of air drawn into the hollow shank 7 under the action of the jet issuing from the nozzle 8, may be so regulated as to produce a perfect combustible mixture. The ample proportions of the hollow of the shank serve to afford within it a chamber for thorough mixing of the two gases before they reach the point of combustion as will be manifest from further description.

The outer end of the shank 7 is bifurcated, as shown at 11 in Fig. I, to receive a soldering bit 13 which has an axial cavity 14. Said bit 13 is square in cross section, and formed with a tapered tip 15 as is usual with soldering tools. In practice, I prefer to make the bit of a good heat conducting material preferably copper, and the same may be attached by any appropriate securing means, for example by screw bolts such as shown at 16. From Fig. I, it will be noted that the mouth of the bore of the bit 13 is aligned with the duct of the shank 7, and that in the interval between them, the prongs 17—17 of the bifurcation are oppositely bowed outwardly to afford a substantially annular, transversely extending, open ended passage 18, which serves as a combustion chamber for the fuel gases and is larger in diameter than the shank thus affording maximum communication between the interior of the shank and the atmosphere.

In the practical operation of the device, the flame resulting from the combustion of the gas delivered from the hose 6 under pressure, is directed through the jet nozzle 8 and the shank 7 into the cavity 14 of the bit 13, thereby efficiently heating the same, while the products of the combustion are permitted to escape through the open ends of the passage 18 in the manner suggested by the arrows in Fig. II.

Having thus described my invention, I claim:

1. A soldering tool comprising a tubular shank constituting a mixing chamber and formed at one end with a lateral opening greater in diameter than the diameter of the shank affording maximum communication between the atmosphere and the mixing chamber, means for admitting gaseous fuel to the mixing chamber, and controlling means for admitting air to the mixing chamber for admixture with the fuel prior to combustion of the latter within the aforesaid lateral opening, and a bit carried by the shank in close relation to the combustion zone.

2. A soldering tool comprising a tubular shank constituting a mixing chamber and enlarged at one end to form a combustion chamber, said chamber being intersected by a wide transverse passage greater in diameter than the shank affording maximum communication at both ends between the atmosphere and combustion chamber, means for admitting gaseous fuel to the mixing chamber, controllable means for admitting air to the mixing chamber for admixture with the fuel prior to combustion of the mixture within the combustion chamber, and a bit carried by the walls of the combustion chamber and located within the combustion zone.

3. A soldering tool of the character described, comprising, in combination, a soldering bit having at its inner end, an axial cavity; and an axially aligned hollow supporting shank through which a mixture of air and fuel gas under pressure is conducted and directed to the cavity of the bit, said shank being generally tubular except for a bifurcation within which the bit is received, the prongs of the bifurcation being bowed oppositely outward between the point of attachment of the bit and the region of their mergence with the tubular portion of the shank to afford a transversely extending, substantially cylindrical, open ended combustion chamber between the discharge end of the duct of the shank and the mouth of the bore of the bit.

4. A tool of the character described comprising a tubular shank having air inlet openings formed at one end, and having its other end bifurcated and the split terminals bowed to form a cylindrical, open-ended combustion chamber, a recessed bit fitted between the terminals, bolts securing the terminals to the bit in a releasable manner, a gas feeding tube fitted to the other end of the shank, and a nozzle seated in said tube and protruding into the shank to a point beyond the air inlet openings.

In testimony whereof I have hereunto signed my name at Philadelphia, Pennsylvania, this 19th day of January, 1921.

THOMAS CUNNINGHAM.

Witnesses:
JAMES H. BELL,
E. L. FULLERTON.